(12) United States Patent
Dudar et al.

(10) Patent No.: US 8,279,549 B2
(45) Date of Patent: Oct. 2, 2012

(54) SYSTEM AND METHOD FOR SETTING BIAS FOR MR HEAD

(75) Inventors: Taras Vasylyovych Dudar, Plano, TX (US); Matthew Ghaleb Sunna, Murphy, TX (US); Glauco Rizzo, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 45 days.

(21) Appl. No.: 12/432,349

(22) Filed: Apr. 29, 2009

(65) Prior Publication Data

US 2010/0277824 A1 Nov. 4, 2010

(51) Int. Cl.
 *G11B 5/03* (2006.01)
(52) U.S. Cl. ............ 360/66; 360/46; 360/67; 360/68
(58) Field of Classification Search ............. None
See application file for complete search history.

(56) References Cited

U.S. PATENT DOCUMENTS

| | | | |
|---|---|---|---|
| 5,087,884 A * | 2/1992 | Brannon | 324/523 |
| 5,367,411 A * | 11/1994 | Nishiyama et al. | 360/66 |
| 5,412,518 A | 5/1995 | Christner et al. | |
| 5,790,334 A * | 8/1998 | Cunningham | 360/66 |
| 5,978,163 A | 11/1999 | Cunningham | |
| 6,067,200 A * | 5/2000 | Ohba et al. | 360/66 |
| 6,134,060 A | 10/2000 | Ryat | |
| 6,225,802 B1 * | 5/2001 | Ramalho et al. | 324/252 |
| 6,320,713 B1 * | 11/2001 | Tretter et al. | 360/66 |
| 6,492,864 B2 * | 12/2002 | Mahrla | 327/540 |
| 6,556,366 B2 | 4/2003 | Patti et al. | |
| 6,751,039 B1 * | 6/2004 | Ngo et al. | 360/66 |
| 6,947,238 B2 * | 9/2005 | Takayoshi et al. | 360/66 |
| 7,141,964 B2 * | 11/2006 | Hoffman et al. | 324/207.12 |
| 7,667,914 B2 * | 2/2010 | Contreras et al. | 360/66 |
| 7,692,887 B2 * | 4/2010 | Dolan et al. | 360/31 |
| 7,741,900 B1 * | 6/2010 | Li | 327/540 |
| 7,800,854 B1 * | 9/2010 | Tan et al. | 360/66 |
| 2002/0181135 A1 * | 12/2002 | Takeuchi et al. | 360/66 |
| 2003/0030934 A1 * | 2/2003 | Schaff et al. | 360/66 |
| 2003/0223287 A1 * | 12/2003 | Sharifi et al. | 365/200 |
| 2008/0062551 A1 * | 3/2008 | Dolan et al. | 360/31 |

* cited by examiner

*Primary Examiner* — Dismery Mercedes
(74) *Attorney, Agent, or Firm* — John J. Patti; Wade J. Brady, III; Frederick J. Telecky, Jr.

(57) ABSTRACT

A device for setting a bias for a magneto-resistive (MR) head can include a counter configured to provide a count value that varies incrementally from a first count value to a maximum count value. Logic is configured to determine at least one of whether the bias for the MR head has reached a predetermined threshold and whether the counter has reached the maximum count value. The logic provides a bias output signal corresponding to the count value for setting the bias of the MR head according to the determination by the logic.

13 Claims, 3 Drawing Sheets

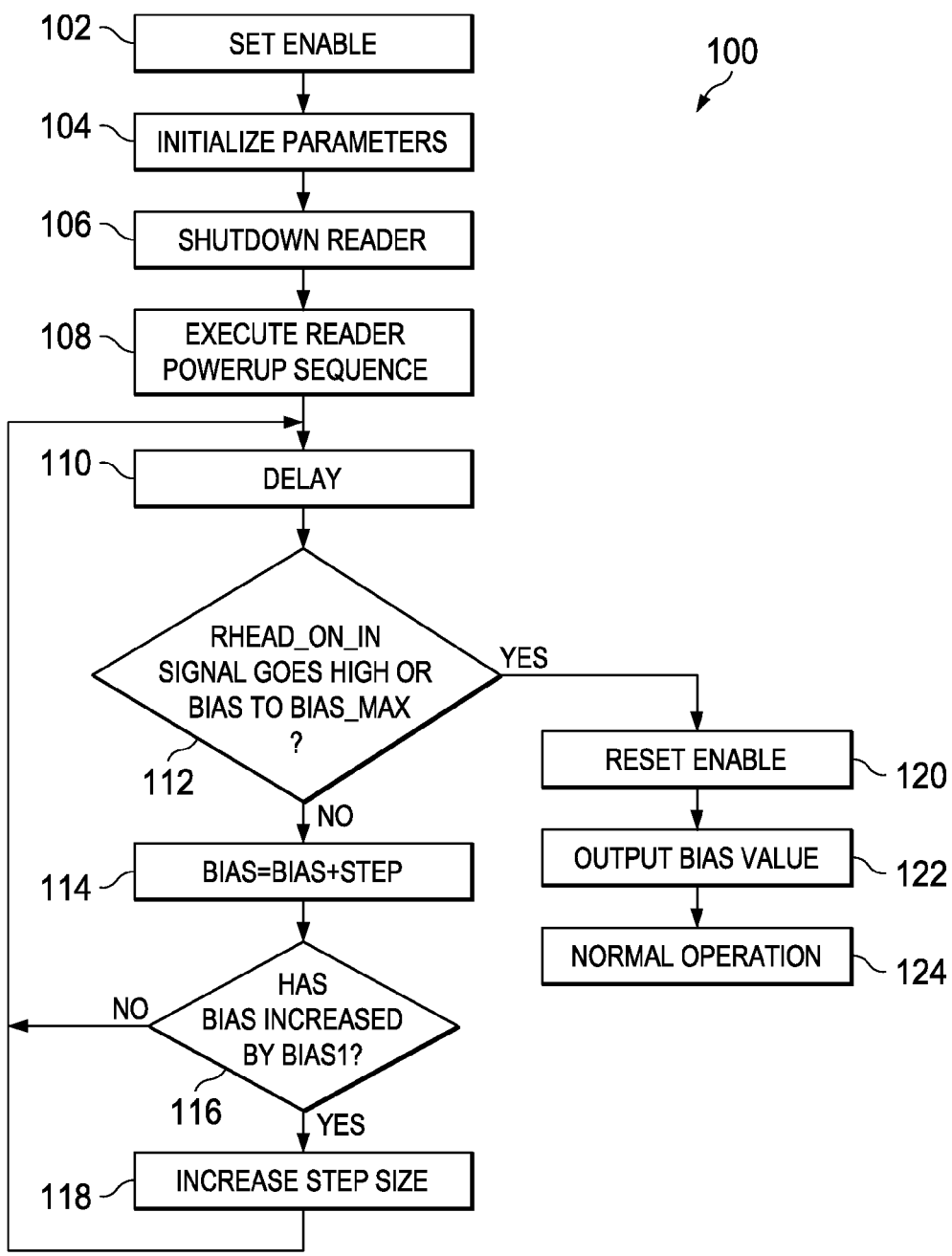

SYSTEM AND METHOD FOR SETTING BIAS FOR MR HEAD

TECHNICAL FIELD

This invention relates to electronic circuits, and more specifically to a system and method to set the bias for a magneto-resistive head.

BACKGROUND

Driver circuits and preamplifier circuits are used in numerous applications, such as in circuitry configured for reading and writing data to a magnetic medium, such as hard disk drives. In many hard disk drive designs, preamplifier reader input current bias and voltage bias are programmable using a multi-bit digital-to-analog converter (DAC). The purpose of this DAC is to enable an accurate voltage or current to be set across each magneto-resistive head in the disk drive. For example, the desired DAC setting is the highest value possible before the voltage breakdown of the magneto-resistive head occurs (a specific voltage value common to all the heads). The resistance of each magneto-resistive head can vary considerably, such as from about 75Ω to about 1400Ω. Consequently, the DAC is required to cover a wide range of currents (Ibias mode) or voltages (Vbias mode).

Due to high head resistance variation, sophisticated search algorithms have been developed to determine the desired DAC setting. The search algorithms are stored on the drive RAM and are run at drive power-up. However, the space on the RAM is limited and due to the sophistication of the search algorithms much of the available memory is consumed by the algorithm. Additionally, the sophistication of such search algorithms tends to increase development time. The testing of such algorithms by the supplier or manufacturer of the preamps is also usually time consuming, which increases production time for many disk drive products.

SUMMARY

One embodiment of the invention provides a device for setting a bias for a magneto-resistive (MR) head. The device can include a counter configured to provide a count value that varies incrementally from a first count value to a maximum count value. Logic is configured to determine at least one of whether the bias for the MR head has reached a predetermined threshold and whether the counter has reached the maximum count value. The logic provides a bias output signal corresponding to the count value for setting the bias of the MR head according to the determination by the logic.

Another embodiment of the invention provides a disk drive system that includes a magneto-resistive (MR) head. A monitor is coupled to monitor a voltage across the MR head and provide an output signal indicating whether the voltage across the MR head is equal or greater than a threshold. Logic sweeps through bias values based on incrementing a counter and provides a bias output signal based a count value of the counter. The logic terminates incrementing the counter if the output signal indicates that the voltage across the MR head has reached the threshold or if the counter output has reached a maximum count value. A digital-to-analog converter converts the bias output signal to a corresponding analog bias for the MR head.

Still another embodiment of the invention relates to a method for setting a bias for a magneto-resistive (MR) head of a disk drive system. The method includes incrementing a counter based on a clock signal and providing a bias output signal based on an output of the counter. The counter stops in response to determining that the bias has reached a desired bias level. After stopping the counter, the bias for the MR head is set based on the output of the counter.

BRIEF DESCRIPTION OF THE DRAWINGS

FIG. 3 is a flow diagram depicting a method for automated bias setting according to an embodiment of the invention.

DETAILED DESCRIPTION

The invention relates to systems and methods to set bias of a magneto-resistive (MR) head of a disk drive system, such as a bias current or bias voltage for that is provided across the MR head. The systems and methods can be used in a disk drive system as well as in combination with testing equipment, such as used by a supplier or manufacturer. According to one embodiment, the system includes logic that sweeps a DAC (e.g., a current DAC) output until the voltage across the head reaches a predetermined value, which can be programmable. The sweeping is controlled by a counter output. This approach enables disk drive manufacturers and suppliers to automatically set the specified bias for each head quickly and with less programming effort than many existing sophisticated search algorithms. The approach also is applicable for electrically testing the preamplifier bias over range of DAC output values, which can be monitored by corresponding test equipment.

Figure 1:
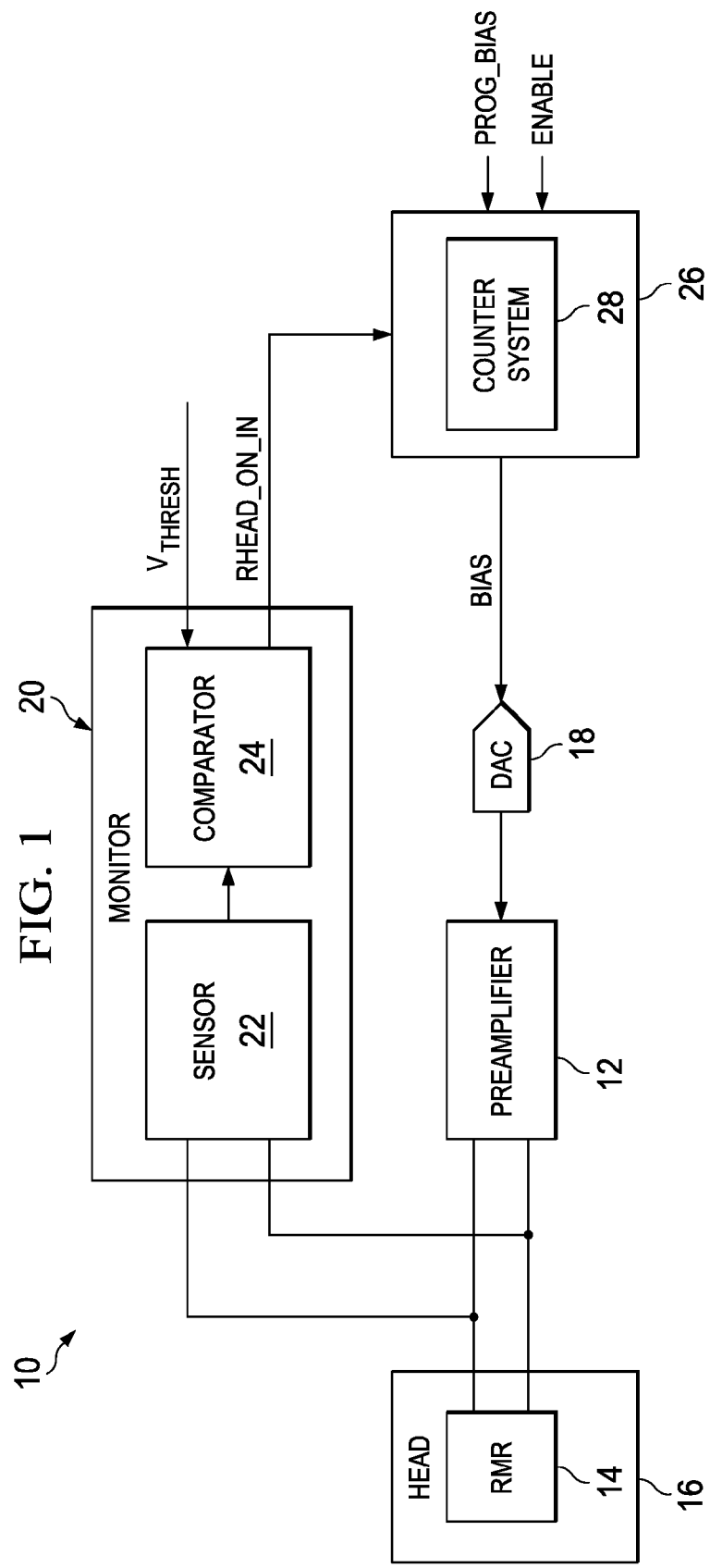
FIG. 1 illustrates an example of a preamplifier system implementing logic for automated bias setting according to an embodiment of the invention.

FIG. 1 depicts an example of a system 10 that is configured for setting a bias for a preamplifier 12. The preamplifier 12 is coupled to a MR resistor 14 that is connected to a head 16 of a disk drive system. The MR resistor 14 has a resistance represented herein as $R_{MR}$. During operation of a hard disk drive, the value of $R_{MR}$ changes in response to changes in the magnetic flux (e.g., polarity) on the surface of the disk. By applying a voltage (or current) signal through the resistor 14, the voltage across the resistor varies according to the detected magnetic flux on the hard disk. The voltage (or current) signal from the head 16 thus is provided to the preamplifier 12 as input signal indicative of information being read from the disk surface.

The value of the resistor 14 can vary substantially from disk drive to disk drive from such ranging from about 75Ω to about 1400Ω. To accommodate such variation in the resistance of the resistor 14, a bias provided by a digital-to-analog converter (DAC) 18 to enable accurate voltage or current to be set across the MR head 16.

A monitoring circuit 20 is configured to monitor the voltage or current across the resistor 14 and provide an output signal, indicated at RHEAD_ON_IN, in response to the sensed voltage or current exceeding a predetermined threshold. In the example of FIG. 1, the monitoring circuit 20 includes a sensor 22 that is coupled across the MR head 16, the sensor 22 provides an output signal to a comparator 24 indicative of the voltage or current across the MR head 16. The comparator 24 compares the output from the sensor 22 relative to a predetermined threshold, indicated as $V_{THRESH}$, to provide the corresponding RHEAD_ON_IN output signal to logic 26. The threshold voltage $V_{THRESH}$ can be programmable to a predetermined value, such as corresponding to the highest voltage across the MR head 16 before voltage breakdown of the head occurs. It will be further appreciated that the monitoring circuitry can be implemented as analog circuitry, digital circuitry or a combination of analog and digital circuitry configured to provide the RHEAD_ON_IN output signal.

The logic 26 is configured to provide a bias value to the DAC 18 by performing an automated bias sweeping algorithm—when enabled. For example, the logic 26 can receive an enable signal, such as in response to setting a register instructing the system 10 to set the bias for the preamplifier 12. The enable signal can be asserted as part of a power up sequence. Additionally or alternatively, the logic 26 can be enabled by asserting the enable signal to perform bias adjustments, such as may be desired from time to time to correct for variations in the $R_{MR}$ of the head 16 that tend to occur during operation. Still another alternative is to enable the logic 26 as part of a test sequence such as may be performed by a manufacturer or supplier of the system 10.

The logic 26 is configured to determine when an appropriate bias level has been obtained. For example, the logic 26 can determine whether the bias has reached a value that causes the voltage across the resistor 14 to be equal to or greater than the threshold $V_{THRESH}$. Alternatively, if the voltage across the MR head 16 does not reach the threshold, the logic 26 can determine whether a maximum count value has been reached by an associated counter system 28.

For example, the counter system 28 is configured to provide an output bias count value that varies incrementally from a first count value to a predetermined maximum count value. Thus, if the counter system 28 reaches the maximum count value before the voltage across the MR head 16 reaches the threshold $V_{THRESH}$, the logic 26 can provide the bias count signal as corresponding to the maximum count value. In this way, the logic 26 provides a bias value to the DAC 18 to set the corresponding bias for the preamplifier 12. The DAC is configured to convert the bias value from the logic to a corresponding analog voltage or current bias, depending on its implementation.

In one embodiment, the counter system 28 can include stepping logic that is further configured to increase a step size of the counter during the bias setting sequence. The stepping logic can increase the count step size, such after incrementing the predetermined range of count values. For example, the increase in the step size can be set according to a multiplier that is applied to increase each time the count value increases by a predetermined amount. As one example, the multiplier can be set to multiply the current step size by a predefined positive integer that is multiplied by the current step size doubles every predetermined number of counts (e.g., 64 counts). By employing such a multiplier, the counting will speed up non-linearly during the sweeping sequence each time the multiplier is applied to increase the step size.

Figure 2:
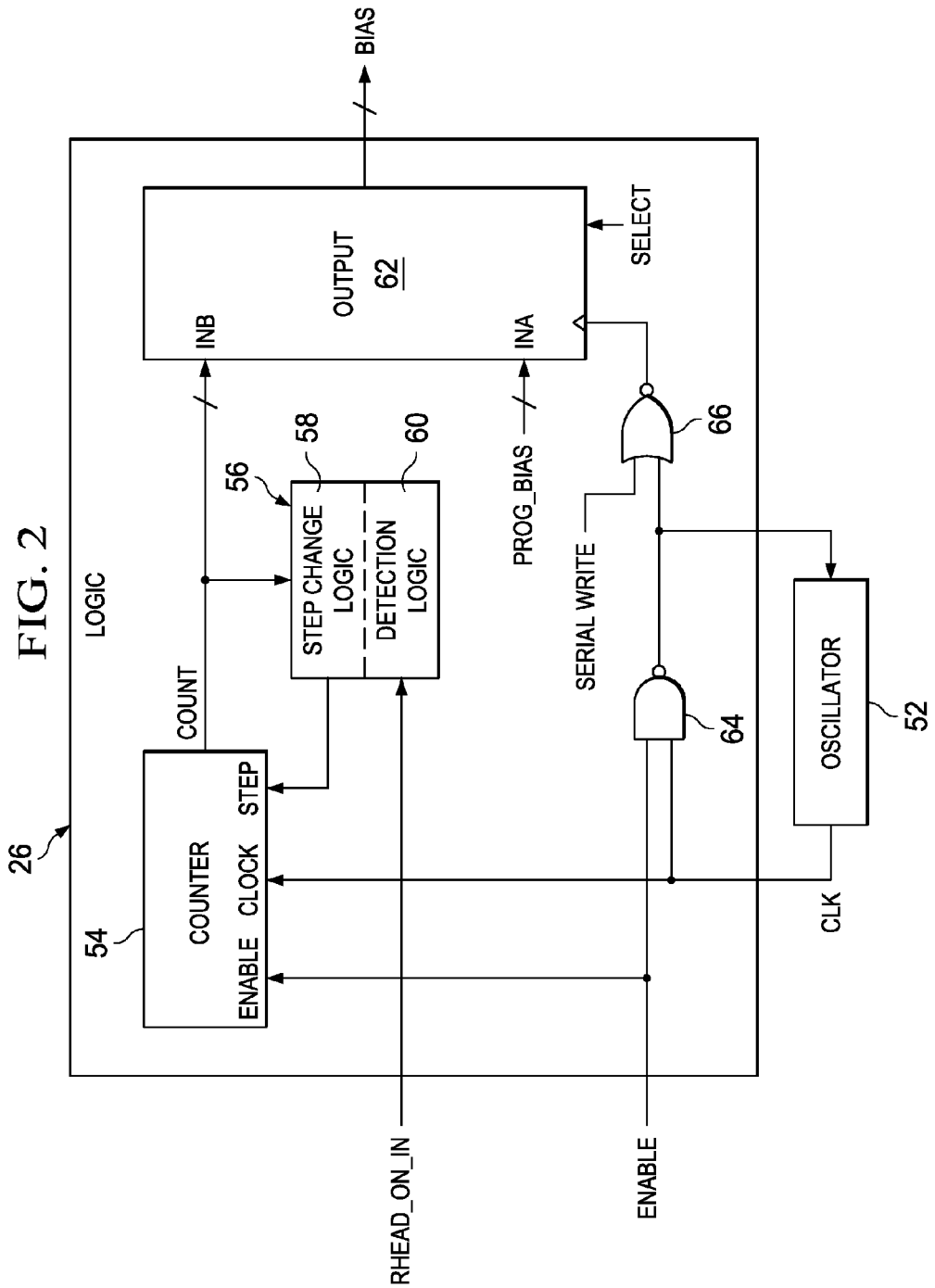
FIG. 2 depicts an example of a system for setting a bias according to an embodiment of the invention.

FIG. 2 depicts an example embodiment of logic 26 that can be utilized to perform automated bias sweeping. The logic 26 is configured to provide a digital bias output signal (e.g., a multi-bit signal) that is provided to corresponding analog circuitry for generating a bias current or voltage for a preamplifier. The logic 26 is activated in response to an enable signal. The enable signal can be provided by other circuitry (not shown), such as by setting a bit in a corresponding register, to activate the automated bias sweeping that is performed by the logic 26. As described herein, the automated bias sweeping can be enabled at power-up of the corresponding disk drive or at a subsequent time to perform an adjustment to compensate for the effects of changes in the resistance of the MR head. The operation of the logic 26 is controlled by a clock signal (CLK) that is generated by an oscillator 52. While the oscillator 52 is depicted as being external relative to the logic 26, it is to be understood and appreciated that the oscillator could be implemented within the logic. Additionally the oscillator 52 can be specifically adapted to a provide the CLK signal for the logic 26 or, alternatively, the CLK signal specifically could be generated by leveraging an existing clock running in the disk drive control signal for another purpose.

The logic 26 includes a counter 54 that is configured to count from a first, minimum count value to a maximum count value. The maximum count value can be set depending on the number of N bits provided in the output count signal, where N is a positive integer denoting the number of bits provided by the output of the counter. Thus, while the counter is enabled by the enable signal and the clock is incrementing, the counter 54 will increment the count value in response to the CLK signal. The counter 54 can be implemented as hardware (e.g., digital logic gates arranged and configured to perform the desired counting function), as software (e g , running on a processor or controller in the disk drive system) or as a combination of hardware and software. When implemented as hardware as depicted in FIG. 2, once enabled, the logic 26 requires no external signal as it can automatically run from an internal timer.

In the example of FIG. 2, the counter also includes a step input that defines the step size for the counter 54 thus the value provided to the step input of the counter 54 can vary the step size over the range of bias values provided by the logic 26 the time to increment from the minimum count value to the maximum count value can be increased from a traditional unary step size counter. By way of example, the current DAC provides current through the head depending on the count value of the counter 54. Thus, the initial current is low and increases in small step size (e.g., initially incrementing by one). In this way, if the head resistance is high (e.g., near the maximum 1400Ω), the voltage across the head does not increase by large amounts. However, if the maximum threshold is not exceeded during a first portion of the count (e.g., a value of 64), it is understood that the head resistance is something much less than (e.g., about half) the maximum resistance such that the step size can be increased. The step sizes can continue to increase in this manner until the bias causes the voltage across the head to reach (or be near) the predetermined threshold voltage. As a result, accuracy in setting the bias can be maintained during the bias setting mode while expediting the testing process.

To implement the change in the step input, the logic 26 also includes step change and end of count detection logic 56. The step change and end of count detection logic 56 includes step change logic 58 that is configured to increment the step size after the counter 54 increments the count value by a predetermined amount. As one example, the step change logic 58 can increase the step size, such as by multiplying the current step size by a predefined multiplier value (e.g., two) each time the count value increases by a predetermined amount (e.g., sixty-four or another value). Alternatively, the multiplier may be variable.

Those skilled in the art will understand and appreciate various approaches that may be employed to configure the counter 54 and step change logic 58 based on the teachings herein. For example, the step change logic 58 may be implemented as part of the counter to increase the step size during the bias sweeping. Those skilled in the art will understand and appreciate that the step size can be increased according to other approaches, such as being triggered based upon monitoring the CLK signal.

The logic 56 also includes detection logic 60 configured to determine if the voltage across the head reaches a predetermined voltage threshold or if the counter 54 has reached a maximum count value. The maximum count value can be a maximum count value that can be provided by the counter 54 or another predetermined maximum value associated with a maximum bias value. To detect if the bias has reached its predetermined value, the detection logic 60 receives a RHEAD_ON_IN signal such as can be provided as a digital output by monitoring circuitry (e.g., monitor 20 shown and described in FIG. 1). The count value can be provided to an output stage 62, which during the bias setting sequence can provide the bias output signal to corresponding analog circuitry, such as an associated DAC. The bias output signal thus can have a digital value (e.g., N bits) corresponding to the input of the output stage 62.

By way of example, the output stage 62 can be implemented as a plurality of latches that are configured to latch a selected input to the output as the bias output signal. For instance, the output stage 62 can include two or more inputs, such as at least an input INA and an input INB that receives the count N bit count signal from the counter 54. The output stage 62 can also include another input INA that receives a programmed bias (PROG-_BIAS) signal. The output stage 62 can be controlled to provide the bias output signal in response to a clock signal provided by associated logic that provides a selection signal. The output stage 62 employs the SELECT signal to select which of the inputs INB or INA are passed through to provide the bias output signal. For example, the SELECT signal can correspond to the ENABLE signal that is utilized to activate the logic 26. Thus, if the logic 26 is enabled, the SELECT signal causes the output stage to provide INB as the bias output signal. Alternatively, if the logic 26 is not enabled (e.g., during normal or other operating modes), the output stage 62 can provide the PROG-_BIAS signal as the bias output signal. For instance, the PROG BIAS signal can be a programmable value that can be utilized to set the bias signal to a desired value, such as can be set via a serial write shifter. After the desired bias has been determined, the corresponding count value can be written to the PROG-_BIAS that is used as the bias output signal during normal operation. Alternatively, INB can be selected to provide the desired bias signal.

In the example of FIG. 2, the enable signal can also be provided to a NAND-gate 64 that NANDs the enable signal with the CLK signal to provide a corresponding output to both a NOR-gate 66 and as feed back to the oscillator 52 for creating an oscillator loop. While the enable signal is asserted, the NAND-gate 64 provides an inverted version of the CLK signal to the input of the NOR-gate 66. Thus by NORing the write input signal with the output of the NAND-gate 64, a corresponding clock signal is provided to a clock input of the output stage 62 to control which of the inputs (INB or INA) is provided as the bias output signal. Thus, in the example of FIG. 2 the NAND-gate 64 and the NOR-gate 66 control clocking the output stage 62 for latching a selected input (INA or INB) as the bias output signal. The N-bit bias signal can be provided to the DAC for controlling the bias voltage or bias current for the associated preamplifier.

Additionally, the logic 26 can be utilized as part of a test circuit in which the bias value is monitored between its low value and maximum value to determine that the logic 26 and associated preamplifier circuitry is operating properly for sweeping the bias output. For example, to electrically test the preamplifier system, the threshold can be set to a maximum value and the corresponding bias of the reader can be captured using suitable test equipment, such as known in the art. As a result of the logic circuit, testing of the preamplifier is facilitated relative to testing performed on other architectures. Additionally, the preamplifier testing time over a range of bias values can be performed more quickly than many existing approaches, thereby reducing overall testing time.

In view of the foregoing structural and functional features described above, certain methods will be better appreciated with reference to FIG. 3. It is to be understood and appreciated that the illustrated actions, in other embodiments, may occur in different orders and/or concurrently with other actions. Moreover, not all illustrated features may be required to implement a method.

FIG. 3 is a flow diagram 100 depicting the method for setting bias across a head of a disk drive system. In the example of FIG. 3, the method begins at 102 in which an enable bit is set. The enable bit can be set to activate the bias sweeping sequence, such as can be performed by logic shown and described herein. At 104, parameters are initialized, which can include electrical parameters and other parameters associated with the sweeping method. For instance, the parameter initialization can include resetting the bias to zero and setting a bias count step equal to one or another predetermined starting value.

At 106 the reader associated with the head is shut down to facilitate the sweeping bias implemented by the method 100. After the reader has been shut down at 106, the reader power-up sequence is executed up to a predetermined time period in the sequence and then discontinued. At 110, a delay can be implemented (e.g., for one or more count cycles) to allow voltages and currents to settle to appropriate levels.

At 112, a determination is made as to whether the RHEAD_ON_IN signal goes high or if the bias has reached a maximum value. If the determination at 112 is negative (NO), indicating that a desired bias has not been reached, the method proceeds to 114 in which the bias value is incremented according to the step size. At 116, another determination is made to determine whether the biased value has increased by a predetermined bias value, indicated at BIAS 1. The BIAS 1 value can be programmed, for example, to determine how often the step size is to increase. At 116, if the bias has not increased by the predetermined BIAS 1 value (NO), the method returns to 110 in which delay is implemented, such as for one count cycle, and the steps 112, 114 are repeated. After the bias has been determined (at 116) to have increased by the predetermined value BIAS 1 (YES), the method proceeds to 118.

At 118, the step size is increased, such as by multiplying the current step size by a multiplier. For example, the step size can be doubled such as by multiplying the current step size times 2. From 118 the method also returns to 110. At 112, if the determination has been made that either the RHEAD_ON_IN signal has gone high or the bias value has reached its maximum bias value as provided by the counter, (YES) the method proceeds to 120. At 120, the enable bit is reset to in turn disable the sweeping bias algorithm and associated logic configured for performing such function. At 122, the counting terminates and the bias value is output for setting the bias accordingly (e.g., by converting the counter value to an analog voltage or current). From 122 the method proceeds to 124 to resume normal operation using the bias determined from the method 100. For instance, if the method 100 is implemented as part of a power up sequence, the power up sequence can resume up to the last timer value. Alternatively or additionally, if the method 100 is implemented during normal operation in which the bias is adjusted, such as to compensate for variations in the resistance of the MR head, normal operation of the disk drive can resume at this time.

In view of the foregoing discussion of circuitry and methods that can be employed to set bias for a preamplifier, those skilled in the art will understand and appreciate various advantages associated with the approach described herein. For example, those skilled in the art will understand that the approach described herein can eliminate the need for sophisticated DAC search algorithms, while also speeding up the disk drive power-up sequence. The approach can also free up RAM memory usage in the disk drive system. As a result, firmware code development can be greatly simplified for drive manufacturers. During normal operation, the circuitry and methods described herein can be employed to further simplify proper bias adjustments, such as to compensate for variations in head resistance that tend to occur over time. The approach described herein further affords a reduction in electrical test time for the preamplifier and disk drive system, which can realize a reduced production cost to the manufacturer providing additional opportunities for improving manufacturing capacity.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. An apparatus comprising:
   a counter configured to provide a count value that varies incrementally from a first count value to a maximum count value; and
   logic configured to determine at least one of whether a bias for a magnetoresistive (MR) head has reached a predetermined threshold and whether the counter has reached the maximum count value, the logic providing a bias output signal corresponding to the count value for setting the bias of the MR head according to the determination by the logic, wherein the logic includes stepping logic that applies a multiplier to increase a step size of the counter after incrementing the counter by a predetermined amount.

2. The apparatus of claim 1, wherein the apparatus further comprises a clock generator that provides a clock signal that defines a substantially fixed time per step incremented by the counter.

3. The apparatus of claim 2, wherein is incremented in response to the clock signal.

4. The apparatus of claim 1, wherein the apparatus further comprises:
   a sensor configured to detect a voltage across the magnetoresistive head, the voltage across the magneto-resistive head varying in dependence on a resistance of the MR head and the bias for the MR head; and
   a comparator providing a control signal being in response to the voltage across the MR head reaching a voltage corresponding to the predetermined threshold.

5. The apparatus of claim 4, wherein the predetermined threshold is programmable.

6. The apparatus of claim 1, wherein the apparatus further comprises an output stage having at least one input, the output stage providing a digital output signal corresponding to the count value from the counter.

7. The apparatus of claim 6, wherein the output stage further comprises at least two inputs, one of the at least two inputs receiving the count value and another of the at least two inputs receiving a programmable bias value, and wherein the apparatus further comprises selection logic providing a selection signal to a control input of the output stage, the output stage providing the digital output signal as one of the count value and the programmable bias value depending on the selection signal.

8. An apparatus comprising:
   a counter;
   a clock generator that is coupled to the counter;
   detection logic that is configured to receive a head state signal, wherein the head state signal is configured to indicate whether an MR head is active;
   step change logic that is coupled to the detection logic and that is coupled the counter so as to receive a count signal from the counter and to transmit a step change signal to the counter;
   an enable circuit that is configured to receive an enable signal, wherein the enable circuit includes:
      a first logic gate having a first input, a second input, and an output, wherein the first input of the first logic gate is configured to receive the enable signal, and wherein the second input of the first logic gate is coupled to an output of the clock generator, and wherein the output of the first logic gate is coupled to an input of the clock generator; and
      a second logic gate having a first input, a second input, and an output, wherein the first input of the second logic gate is configured to receive a serial write signal, and wherein the second input of the second logic gate is coupled to the output of the first logic gate; and an output circuit that is coupled to the enable circuit, that is coupled to the counter so as to receive the count signal, that is configured to receive a programmable bias signal, and that is configured to output a bias signal; and wherein the output of the second logic gate is coupled to the output circuit.

9. The apparatus of claim 8, wherein the first logic gate is a NAND gate, and wherein the second logic gate is a NOR gate.

10. An apparatus comprising:
    a head having an MR resistor;
    a preamplifier that is coupled to the MR resistor;
    a monitor that is coupled to the MR resistor, that is configured to receive a threshold signal, and that is configured to generate a head state signal, wherein the head state signal is configured to indicate whether the head is active;
    bias sweeping logic having:
       a counter;
       a clock generator that is coupled to the counter;
       detection logic that is configured to receive the head state signal;
       step change logic that is coupled to the detection logic and that is coupled the counter so as to receive a count signal from the counter and to transmit a step change signal to the counter;
       an enable circuit that is configured to receive an enable signal, wherein the enable circuit includes:
          a first logic gate having a first input, a second input, and an output, wherein the first input of the first logic gate is configured to receive the enable signal, and wherein the second input of the first logic gate is coupled to an output of the clock generator, and wherein the output of the first logic gate is coupled to an input of the clock generator; and
          a second logic gate having a first input, a second input, and an output, wherein the first input of the second logic gate is configured to receive a serial write signal, and wherein the second input of the second logic gate is coupled to the output of the first logic gate; an output circuit that is coupled to the enable circuit, that is coupled to the counter so as to receive the count signal, that is configured to receive a programmable bias signal, and that is coupled to the preamplifier so as to output a bias signal to the preamplifier; and wherein the output of the second logic gate is coupled to the output circuit.

11. The apparatus of claim 10, wherein the first logic gate is a NAND gate, and wherein the second logic gate is a NOR gate.

12. The apparatus of claim 11, wherein the apparatus further comprises a digital-to-analog converter (DAC) that is coupled between the output circuit and the preamplifier.

13. The apparatus of claim 12, wherein the monitor further comprises:
   a sensor that is coupled to the MR resistor; and
   a comparator that is coupled to the sensor and the detection logic and that is configured to receive the threshold signal.

* * * * *